(12) United States Patent
Nemoto

(10) Patent No.: US 7,756,951 B2
(45) Date of Patent: Jul. 13, 2010

(54) ADAPTIVELY CHANGING APPLICATION SERVER PROCESSING POWER BASED ON DATA VOLUME

(75) Inventor: Kazuo Nemoto, Kawasaki (JP)

(73) Assignee: International Business Machines Corporation, Armonk, NY (US)

(*) Notice: Subject to any disclaimer, the term of this patent is extended or adjusted under 35 U.S.C. 154(b) by 1329 days.

(21) Appl. No.: 11/218,273

(22) Filed: Sep. 1, 2005

(65) Prior Publication Data
US 2006/0064442 A1   Mar. 23, 2006

(30) Foreign Application Priority Data
Sep. 22, 2004   (JP) ............... 2004-276158

(51) Int. Cl.
*H04K 3/00* (2006.01)
(52) U.S. Cl. ................ 709/220; 709/219
(58) Field of Classification Search .......... 709/220
See application file for complete search history.

(56) References Cited

U.S. PATENT DOCUMENTS

| | | | |
|---|---|---|---|
| 6,094,688 A * | 7/2000 | Mellen-Garnett et al. | 719/328 |
| 6,650,621 B1 * | 11/2003 | Maki-Kullas | 370/238 |
| 6,704,576 B1 * | 3/2004 | Brachman et al. | 455/503 |
| 7,010,492 B1 * | 3/2006 | Bassett et al. | 705/1 |
| 7,342,929 B2 * | 3/2008 | Bremler-Barr et al. | 370/395.4 |

FOREIGN PATENT DOCUMENTS

| | | |
|---|---|---|
| JP | 2000101656 | 4/2000 |
| JP | 2000196646 | 7/2000 |
| JP | 2000-232470 | 8/2000 |
| JP | 2000244557 | 9/2000 |
| JP | 2001331333 | 11/2001 |
| JP | 2002-223223 | 8/2002 |
| JP | 2002244896 | 8/2002 |
| JP | 92003-67356 A | 3/2003 |
| JP | 2003067356 | 3/2003 |
| WO | 9946661 | 9/1999 |

\* cited by examiner

*Primary Examiner*—Jeffrey Pwu
*Assistant Examiner*—Sulaiman Nooristany
(74) *Attorney, Agent, or Firm*—Dillon & Yudell LLP

(57) ABSTRACT

A system and method for automatic optimization of communication traffic based on the amount of data exchanged between predetermined systems in EAI. A plurality of application servers are connected to an integration server via a network. A first application server transmits the data to the integration server with information on an amount of the data. A second application server with a second adapter provides the data received from the integration server to the application executing section. The second application server then changes its own processing power based on information on an amount of data added to the received data.

18 Claims, 9 Drawing Sheets

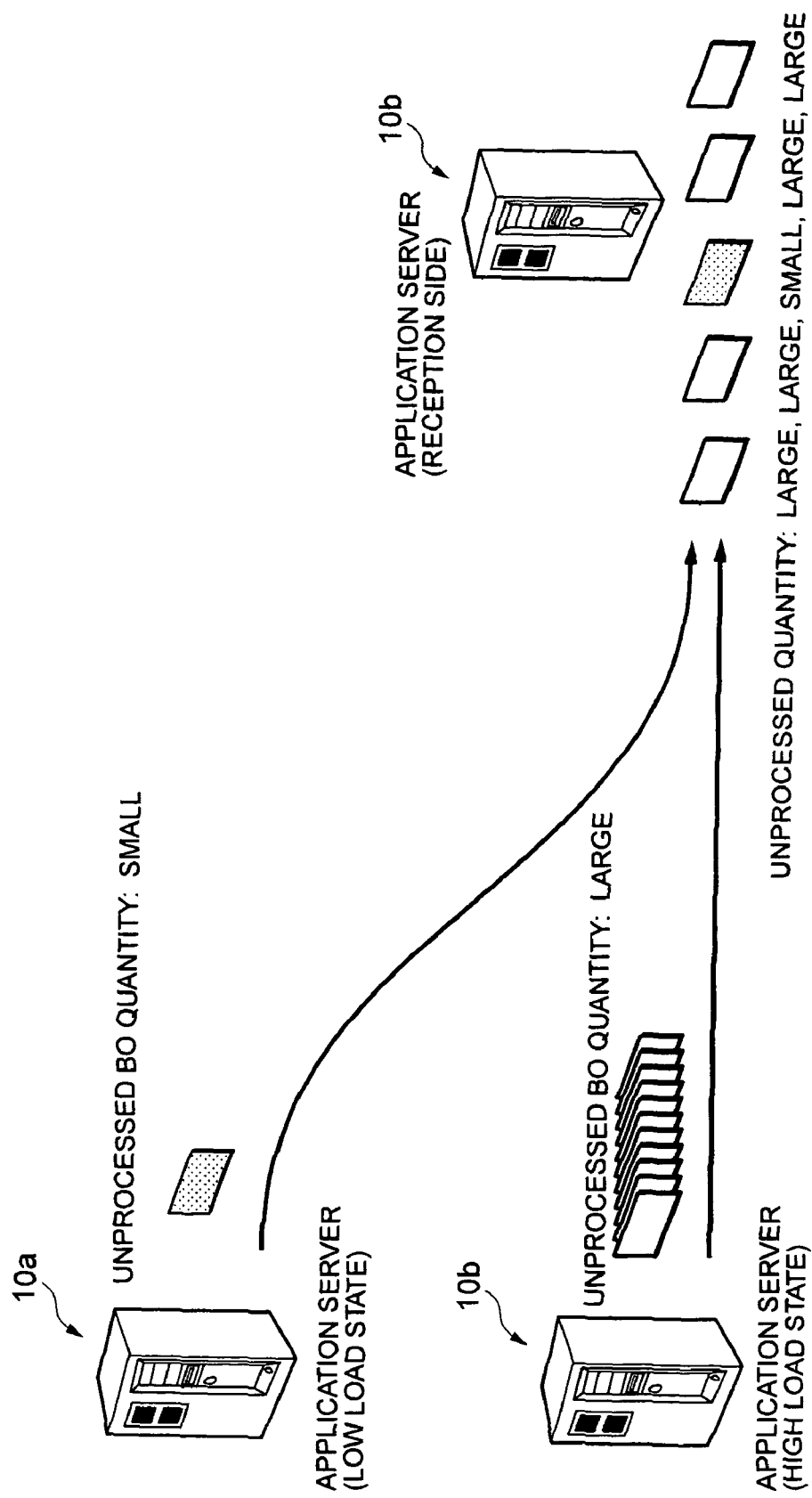

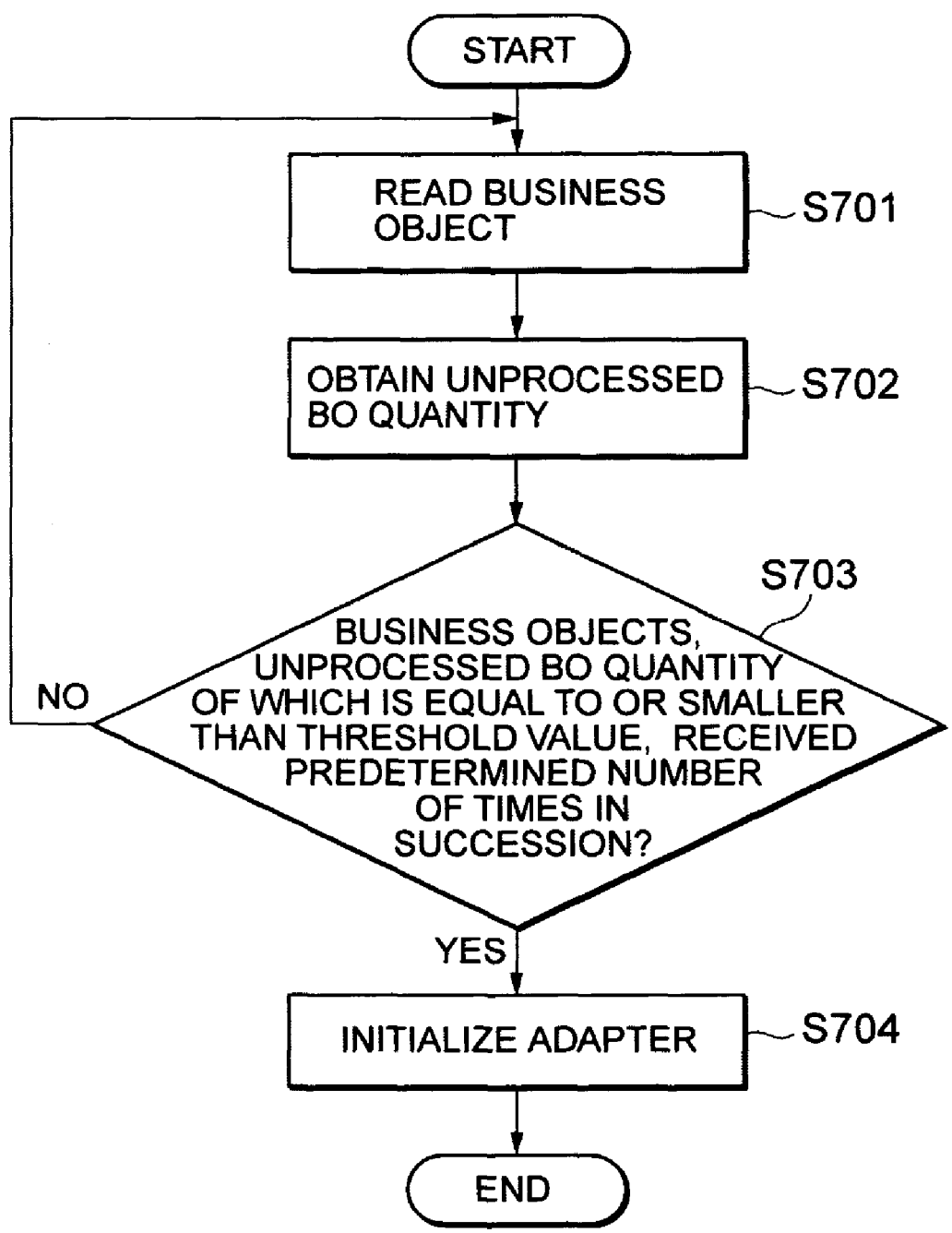

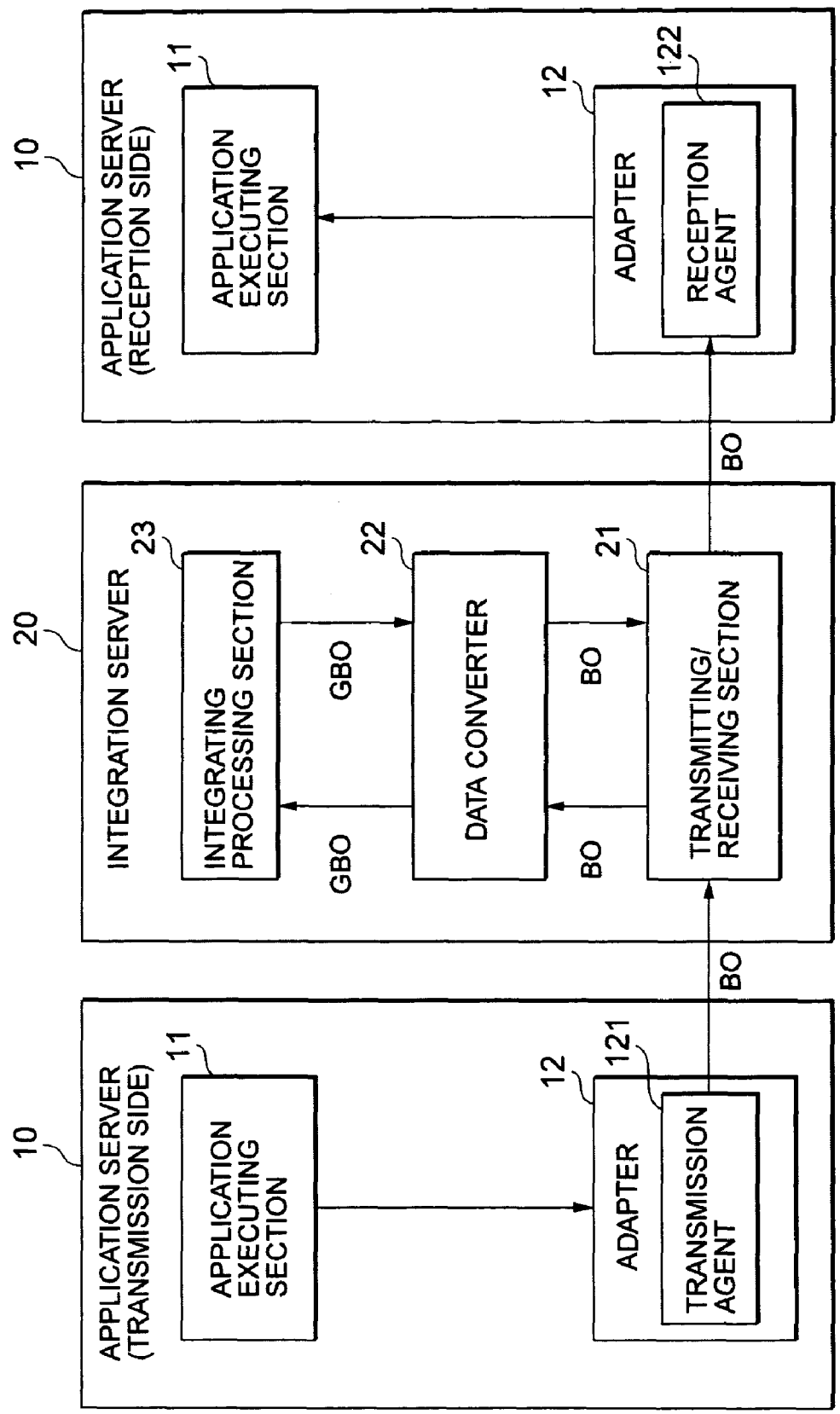

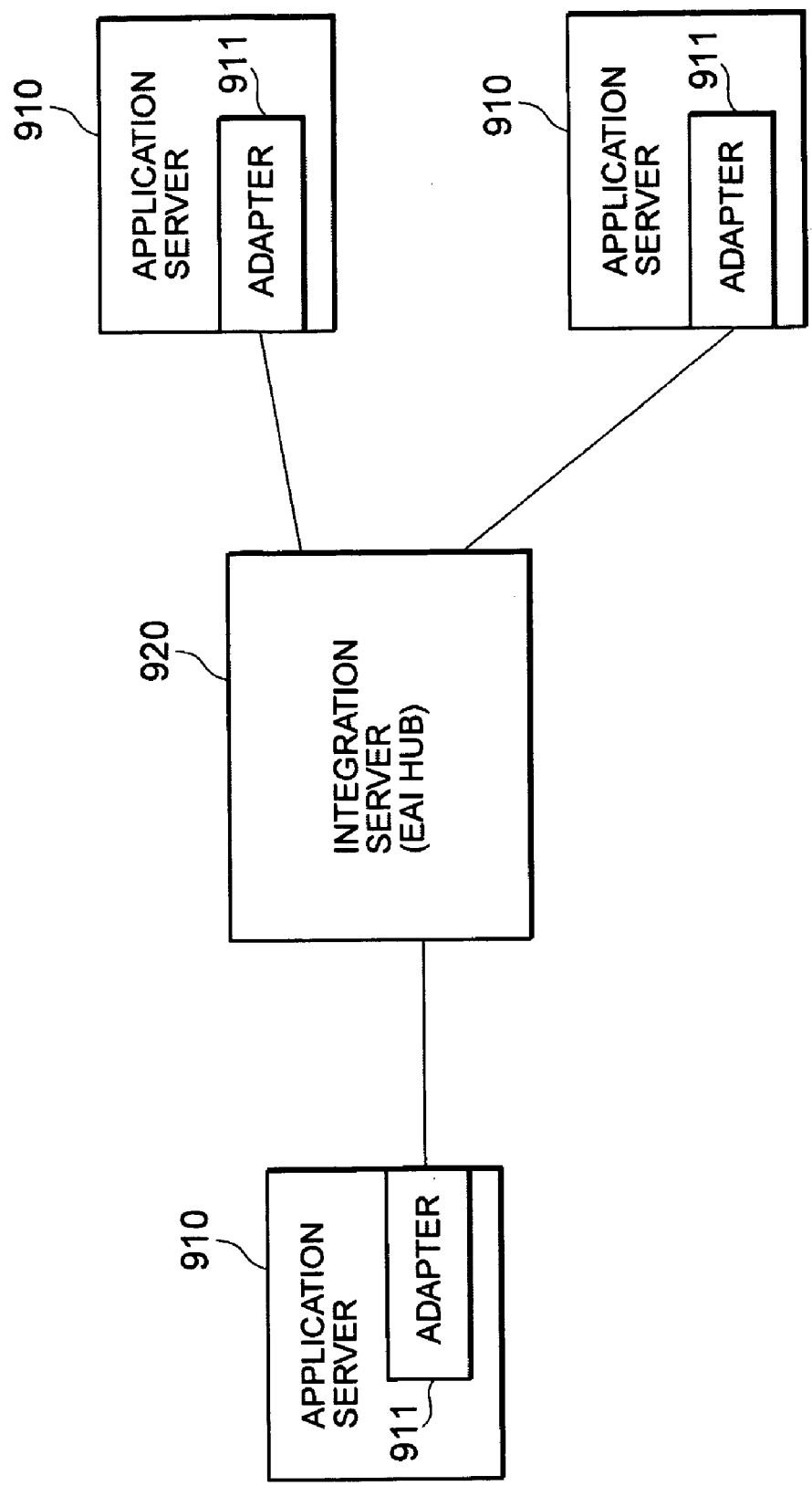

ADAPTIVELY CHANGING APPLICATION SERVER PROCESSING POWER BASED ON DATA VOLUME

TECHNICAL FIELD

The present invention relates to a network system that realizes EAI (Enterprise Application Integration), particularly to a communication control method that copes with a change in communication traffic on a network.

BACKGROUND OF THE INVENTION

For EAI, which enables various computer systems to work together and to be usable integrally, individual computer systems constitute a hub-and-spoke connection relation with an integrated server as the center (see, for example, Japanese Published Unexamined Patent Application 2002-507017 and "Technical Guide", IBM CrossWorlds Core Topic CrossWorlds Overview, [online], June, 2002, IBM Japan, Ltd., [Searched Jul. 28, 2004], Internet <URL:http://www.ibm.com/software/integration/wbiserver/ics/library/infocenter>). As is shown in FIG. 9, application servers 910, which are computer systems integrated by EAI, include adapters (interfaces) 911 to be connected to an integration server (hub) 920. By connection with the integration server 920 via the adapters 911 each of the application servers 910 can cooperate with the other application servers 910 similarly connected to the integration server 920.

In accordance with EAI, when a specific application server 910 transmits data (including a control signal and live data) to the integration server 920, the integration server 920 specifies an application server 910 as a transmission destination, in accordance, for example, with the contents of work to be cooperatively performed, and transmits the data to the specified application server 910 (hereinafter, this data transmission control process performed by the integration server 920 is called an integrating process). In accordance with the work contents, one set of data may be distributed to a plurality of application servers 910, or data received from a plurality of application servers 910 may be transmitted to a single application server 910 that performs a work process using these data.

For the individual application servers 910 constituting EAI, the data transmission and reception rates of the adapters 911 are generally defined. Therefore, when the amount of data exchanged by specific application servers 910 is increased irregularly or momentarily, the data transmission/reception processes performed using the adapters 911 of the individual application servers 910, and the integrating process performed by the integration server 920 can not cope with the change in the communication traffic, and as a result, an extended processing time period is required. Conventionally, in an actual operating state, an EAI system is monitored in order to locate the paths connecting the application servers 910 constituting the system where there is a traffic change, and to ascertain the level of the change in the traffic. Thereafter, the information obtained is reflected in the design of another EAI system.

Another system has been proposed wherein a bypass line is provided between predetermined application servers 910, so that data can be transmitted without having to pass through an integration server 920, and when the amount of data exchanged by these application servers 910 is increased, only a control signal is transmitted via the integration server 920, while live data are transmitted via the bypass and do not pass through the integration server 920 (see, for example, Japanese Published Unexamined Patent Application 2003-67356).

SUMMARY OF THE INVENTION

As is described above, according to EAI, when the amount of data exchanged by predetermined systems is increased, an extended period of time is required for the processing, including the transmission/reception of the data, and the work efficiency is therefore reduced. In order to locate the paths of the application servers constituting an EAI system where traffic is changed, and to ascertain the level of the change in the traffic, the system must actually be operated and the operating state needs to be monitored. However, it is difficult to predict a path where traffic will be increased and design based on the prediction to secure a sufficiently high processing power. It is also difficult for an EAI system to flexibly cope with an irregular change in traffic. It may be possible, by taking an increase in traffic into account, to provide all the EAI systems and networks with a high processing power in advance. However, from the viewpoint of resource management, this countermeasure is not preferable because of a large number of resources that must be allocated for data communication.

Implementing the conventional technique whereby live data are transmitted by using a bypass when the amount of data exchanged by systems is increased requires a massive design change of an entire EAI system group. Therefore, the introduction of this technique is not easy, and costs are increased. Further, since a bypass is provided in advance between specific systems, the conventional technique can cope with only a route along which a traffic change is predicted, and can not flexibly cope with a change in traffic due to data transmission/reception occurring between unspecified systems.

One objective of the present invention is to provide a system and a method whereby, when the amount of data exchanged by predetermined EAI systems is changed, the processing power of the systems related to data transmission/reception are dynamically adjusted so as to automatically optimize communication traffic.

Another objective of the present invention is to easily introduce the above described system into each server that constitutes an EAI system.

To achieve these objectives, the present invention is realized as the following system. This data processing system comprises a plurality of application servers that include, at the least, first and second application servers connected to an integration server via a network. The first application server, which is on a transmission side terminal, includes: a first application executing section, for executing a first process based on a first application; and a first adapter for acquiring data processed in the first process from the first application executing section and for transmitting the data with information on the amount of data to the integration server. The integration server includes: a transmitting and receiving section for transmitting and receiving data exchanged to and from the plurality of application servers; and an integrating processing section for determining, in accordance with a work that is cooperatively performed by the plurality of application servers, a destination application server for received data. The second application server includes: a second application executing section for executing a second process based on a second application; and a second adapter for providing data received from the integration server to the second application executing section. The second application server changes its own processing power based on information on the amount of the data added to the received data.

More specifically, the first adapter converts the data processed in the first process data into a business object that is a packet, and adds to the packet (business object) a succeeding packet quantity indicating the number of succeeding packets as information on the amount of data. The first adapter is a transmission agent. Therefore, when the succeeding packet quantity added to the packet is equal to or greater than a defined value, the first adapter autonomically changes its data transmission power to a high level.

Although the second application server also changes its processing power to a high level when the succeeding packet quantity added to the received packet is equal to or greater than a defined value, it changes its own processing power to a low level when receiving a specified number of packets whose succeeding packet quantity is equal to or smaller than a defined value in succession. Or, serving as a reception agent, the adapter changes its own processing power when it receives, during a predesignated number of reception cycles, a specified number of packets, whose succeeding packet quantity is equal to or greater than a defined value, or whose succeeding packet quantity is equal to or smaller than a defined value.

Further, the second adapter and/or the second application executing section changes its processing power based on information on the amount of the data that is added to the data concerned. In addition, the second adapter is a reception agent, and thus autonomically changes its own processing power based on information on the amount of the data that is added to the data concerned.

Moreover, the integration server changes its own processing power based on the information on the amount of the data that is added to the data concerned.

In the above description, the first application server is on a transmission side and the second application server is on a reception side. These are the roles in a system. Depending on the contents of a cooperatively performed work, the second application server may be on a transmission side and the first application server may be on a reception side. In this case, the second adapter acquires data processed in the second process from the second application executing section, and transmits, to the integration server, the data as well as information on the amount of the data. The first adapter provides, to the first application executing section, the data received from the integration server. And the first application server changes its own processing power based on the information on the amount of the data that is added to the data concerned.

In this system, a first data format, in which the first process can be performed based on the first application, may differ from a second data format, in which the second process can be performed based on the second application. In this case, the integration server includes a data converter for converting the first data format employed for received data into an intermediate data format and providing the data in the intermediate data format to the integrating processing section, and for converting the data received from the integrating processing section from the intermediate data format into the second data format and transmitting the data in the second data format to the transmitting and receiving section.

Further, in this system, besides the first and the second application servers, a third application server may be included. The third application server includes: a third application execution section for executing a third process based on a third application; and a third adapter for acquiring data processed in the third process from the third application executing section and for transmitting the data to the integration server with information on an amount of the data. The second application server changes its own processing power based on the information on the amount of data which is added to the data received from the first application server and the information on the amount of data which is added to the data received from the third application server.

According to another aspect of the invention, provided is a data processing method, applied to a system having a plurality of application servers including at least first and second application servers connected to an integration server via a network.

In this method, the first application server executes a first application execution step for executing a first process based on a first application, a first transmission step for acquiring data processed in the first process and transmitting the data with information on an amount of the data to the integration server.

The integration server executes a first reception step of receiving data from the first application server, an integrating processing step of determining a destination application server for the received data in accordance with a work that is performed by the plurality of application servers in cooperation with each other, a second transmission step of transmitting the data to the destination application server.

The second application server executes a second reception step of receiving the data from the integration server, a second power change step of changing its own processing power based on information on an amount of the data added to the received data, and a second application execution step of executing a second process based on the second application.

According to the present invention, since the processing power of the adapter (reception agent) of each application server can be dynamically adjusted, as needed, based on the amount of data exchanged between specific application servers in the EAI, the EAI communication traffic can be automatically optimized.

Furthermore, since the present invention can be provided simply by software design without adversely affecting the hardware design, like providing of a bypass line, the present invention can be easily introduced not only to a new EAI system, but also a preexisting EAI system.

BRIEF DESCRIPTION OF THE DRAWINGS

FIG. 6 is a diagram showing the state wherein an application server on a reception side simultaneously receives data from a plurality of application servers on a transmission side;

FIG. 7 is a flowchart for explaining the operation of the reception agent according to the embodiment for returning the processing power from a high level to a normal level;

FIG. 8 is a diagram showing the functional configuration of each server of a system where the application servers and the integration server perform synchronous communication; and FIG. 9 is a schematic diagram showing the general configuration of the conventional EAI.

DETAILED DESCRIPTION

The best mode for carrying out the present invention (hereinafter also simply referred to as the embodiment) will now be described in detail while referring to the accompanying drawings.

Figure 1:
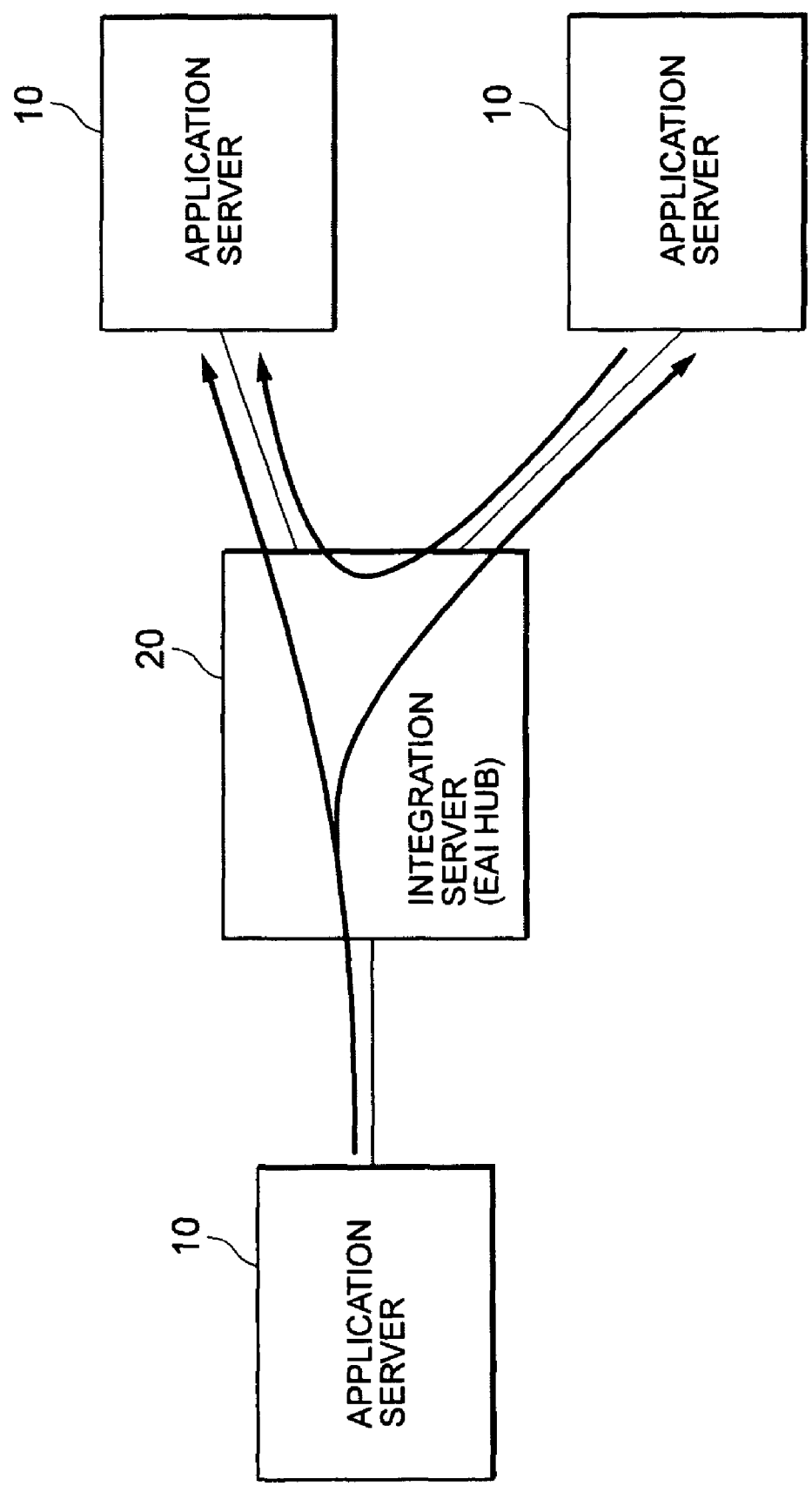
FIG. 1 is a schematic diagram showing the general configuration of EAI to which one embodiment of the present invention is applied.

FIG. 1 is a schematic diagram showing the general configuration of EAI.

As is shown in FIG. 1, the EAI has a hub-and-spoke connection of a plurality of application servers 10 with an integration server 20 in the center. That is, the application servers 10 are connected to the integration server 20 via adapters that are data transmission/reception means. The integration server 20 transmits data received from a specific application server 10 to a destination determined by the integration server. In this way, the work can be performed by plurality of application servers in cooperation with each other.

Figure 2:
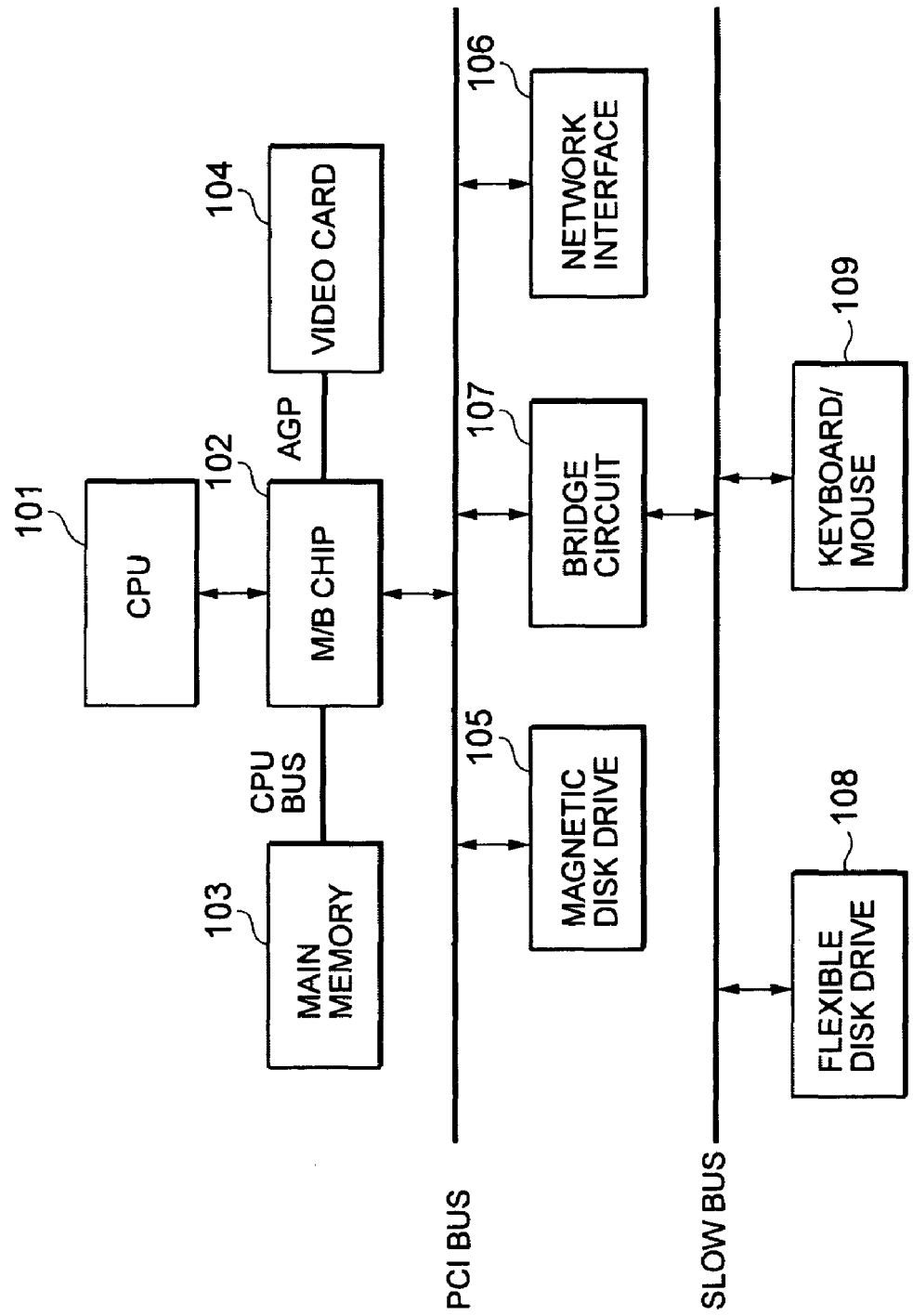
FIG. 2 is a schematic diagram showing an example of hardware configuration for a computer that is appropriate for application servers and an integration server in FIG. 1.

FIG. 2 is a schematic diagram showing an example hardware configuration for a computer that is appropriate for the application servers 10 and the integration server 20 in FIG. 1.

The computer in FIG. 2 has a CPU (Central Processing Unit) 101 that is arithmetic means; an M/B (motherboard) chip set 102; a main memory 103 connected to the CPU 101 via the M/B chip set 102 and a CPU bus; a video card 104 connected to the CPU 101 via the M/B chip set 102 and an AGP (Accelerated Graphics Port); a magnetic disk drive (HDD) 105, a network interface 106 and a bridge circuit 107, connected to the M/B chip set 102 via a PCI (Peripheral Component Interconnect) bus; a flexible disk drive 108 and a keyboard/mouse 109, connected to the M/B chip set 102 via the PCI bus, the bridge circuit 107 and a slow bus, such as an ISA (Industry Standard Architecture) bus.

The hardware configuration of the computer in FIG. 2 is merely an example that realizes the embodiment, and various other configurations can be employed so long as they are applicable to the embodiment. For example, instead of providing the video card 104, only a video memory may be mounted, and the CPU 101 may process image data. Or, as an external storage device, a CD-R (Compact Disc Recordable) drive or a DVD-RAM (Digital Versatile Disc Random Access Memory) drive may be provided via an interface, such as ATA (AT Attachment) or SCSI (Small Computer System Interface).

Figure 3:
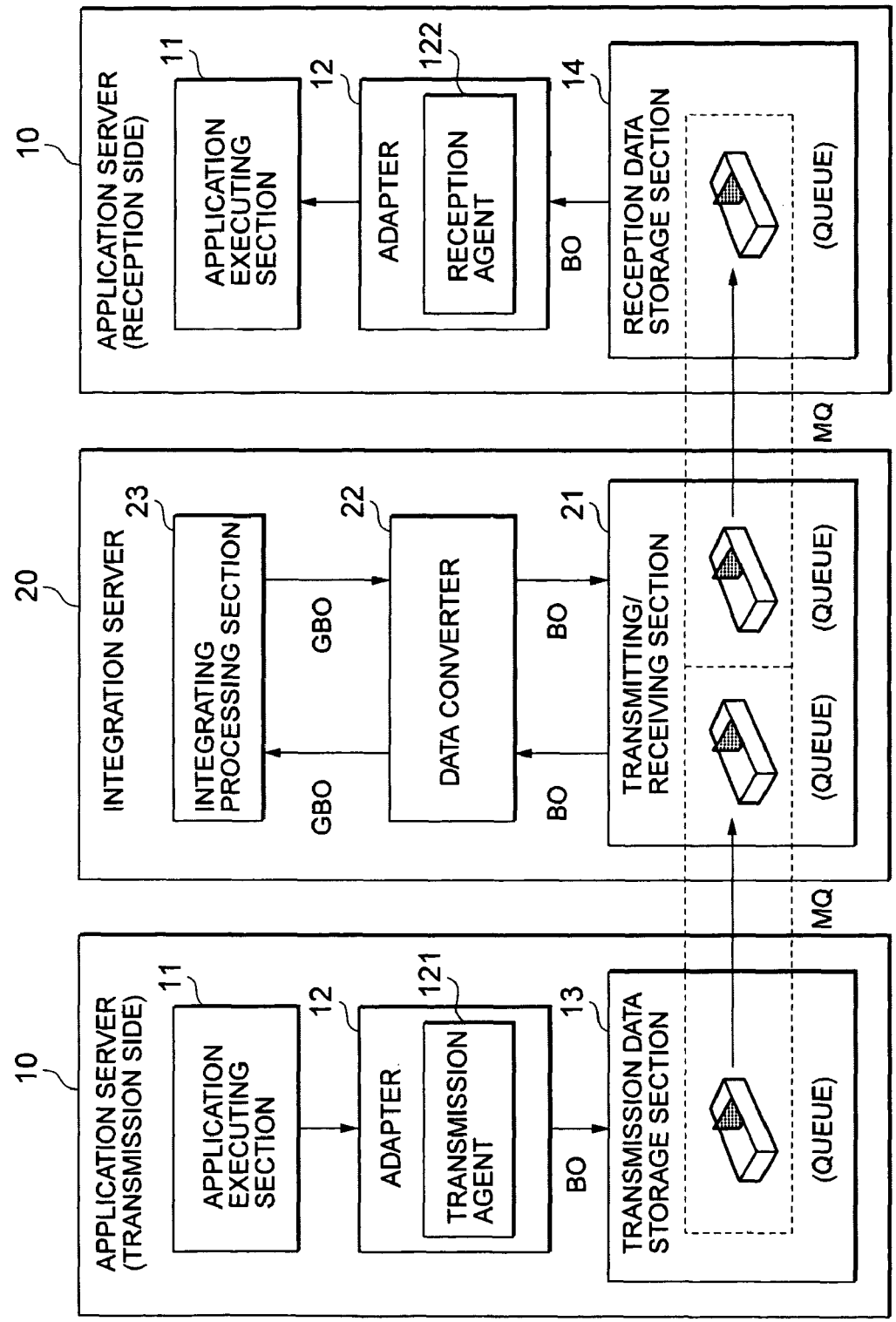
FIG. 3 is a diagram showing the functional configuration of the application servers and the integration server according to the embodiment.

FIG. 3 is a diagram showing the functional configuration of the application servers 10 and the integration server 20.

Referring to FIG. 3, each of the application servers 10 includes: an application executing section 11 for performing various processes for services; an adapter 12 used for connection to the integration server 20; a transmission data storage section (queue) 13; and a reception data storage section (queue) 14. FIG. 3 shows the application servers 10 as a transmission terminal for transmitting data and a reception terminal for receiving data from the integration server 20. The same configuration is employed for the application servers 10 on the transmission side and the reception side, and they are different only in that the transmission function of the adapter 12 is employed for the transmission application server 10, while the reception function of the adapter 12 is employed for the reception application server 10. Furthermore, in FIG. 3, only the transmission data storage section 13 is shown for the transmission application server 10, while only the reception data storage section 14 is shown for the reception application server 10. However, this is also a description based on the transmission and reception sides, respectively. Actually, each application server 10 includes both the transmission data storage section 13 and the reception data storage section 14. Therefore, each application server 10 that constitutes EAI serves as either a transmission terminal or a reception terminal in accordance with a work that is performed in cooperation.

When the application server 10 is constituted by for example, the computer shown in FIG. 2, the application executing section 11 is realized by the program-controlled CPU 101 and storage devices, such as the main memory 103 and the magnetic disk drive 105. In accordance with the control of application programs, the application executing section 11 performs various functions and database functions appropriate for target work.

The adapter 12 is realized by, for example, the program-controlled CPU 101, storage devices such as the main memory 103, and the network interface 106 in FIG. 2. As is described above, the adapter 12 includes a transmission function for acquiring data from the application executing section 11 and transmitting the data to the integration server 20; and a reception function for receiving data from the integration server 20 and providing the data to the application executing section 11. To realize these functions, a transmission agent 121 and a reception agent 122 are provided in the adapter 12. In the example in FIG. 3, the transmission agent 121 is shown in the transmission application server 10, while the reception agent 122 is shown in the reception application server 10. However, similarly to the case of the transmission data storage section 13 and the reception data storage section 14 described above, actually functions of the transmission agent 121 and the reception agent 122 are provided with the adapters 12 of both application servers 10.

The transmission data storage section 13 and the reception data storage section 14 are realized by, for example, the main memory 103 in FIG. 2 or the cache memory of the CPU 101, and are used to temporarily store received data or data to be transmitted. With this arrangement, asynchronous communication using MQ (Message Queuing) can be performed in the embodiment.

The transmission agent 121 acquires from the application executing section 11 data to be transmitted, and stores the data in the format of a business object (BO) in the transmission data storage section 13. That is, in this embodiment, the application servers 10 and the integration server 20 perform data communication while using the business objects as message packets. Further, the transmission agent 121 in this embodiment dynamically adjusts the processing power in accordance with the amount of data to be transmitted, which will be described later in detail. The business object generated by the transmission agent 121 is a business object specialized to an application. Either a polling type or a trigger type can be employed as an agent type. When the transmission agent 121 is of a polling type, the transmission agent 121 monitors the application executing section 11 for every defined period of time, collects data to be transmitted if existent, and generates a business object. When the transmission agent 121 is of a trigger type, the transmission agent 121 receives data from the application executing section 11, and generates a business object based on the received data. The business object thus generated by the transmission agent 121 is first stored in the transmission data storage section 13, and is then transmitted to the integration server 20.

The reception agent 122 reads a business object (data) that is received from the integration server 20 and is stored in the reception data storage section 14, converts the business object into a data format used by the application executing section 11, and provides the resultant business object to the application executing section 11. In this embodiment, the reception agent 122 dynamically adjusts the processing power in accordance with the amount of received data, which will be described later in detail. The type of the reception agent 122 may be either a poling type or a trigger type. When the reception agent 122 is of a polling type, the reception agent 122 monitors the reception data storage section 14 for every defined period of time, extracts received data if existent, and provides the data to the application executing section 11. When the reception agent 122 is of a trigger type, the reception agent 122 extracts data each time the data are stored in the reception data storage section 14, and provides the data to the application executing section 11.

Referring to FIG. 3 again, the integration server 20 includes a transmitting/receiving section 21, a data converter 22 and an integrating processing section 23. When the integration server 20 is constituted by, for example, the computer shown in FIG. 2, the transmitting/receiving section 21 is realized by a storage device, such as the main memory 103 and the network interface 106. The transmitting/receiving section 21 temporarily stores in a queue provided by, for example, the main memory 103, a business object received from the application server 10 and a business object to be transmitted to the application server 10.

The data converter 22 is realized by, for example, the program-controlled CPU 101 shown in FIG. 2. The data converter 22 reads a business object received from the application server 10 from the transmitting/receiving section 21 performs data mapping to convert the business object specialized to an application into a generalized business object (called Generic Business Object or Canonical Data Model; hereinafter referred to as a GBO), and provides the GBO to the integrating processing section 23. The data converter 22 also receives from the integrating processing section 23 a GBO to be transmitted, performs data mapping to convert the GBO into a business object specialized to an application for the application server 10 at a transmission destination, and provides the business object to the transmitting/receiving section 21.

The integrating processing section 23 is realized by, for example, the program-controlled CPU 101 shown in FIG. 2. The integrating processing section 23 acquires, from the data converter 22, the GBO of data received from the application server 10, and determines an application server 10 as a transmission destination for these data in accordance with the contents of the work using the data and so on. Then, the integrating processing section 23 transmits the data to the destination application server 10 through the data converter 22 and the transmitting/receiving section 21. As is described above, the application executing section 11 of each application server 10 exchanges data with an external system using an business object, which is a format specialized to an application for each application executing section 11. Therefore, in order to integrally handle these data, the integrating processing section 23 employs the GBO format as an intermediate data format.

An explanation will now be given for the processing performed by the transmission agent 121 and the reception agent 122 of the adapter 121 for the dynamic adjustment of the processing power.

According to this embodiment, in order to perform the dynamic adjustment of the processing power, when the application executing section 11 executes a predetermined process for transmitting data, the application executing section 11 adds, to the data to be transmitted, information on the amount of the data. Specifically, since data are transmitted as a business object, the number of unprocessed succeeding business objects (hereinafter referred to as an unprocessed BO quantity) is added to each business object to be transmitted. Only an additional information field need be added to an XML file of the business object so that the unprocessed BO quantity can be added.

According to the embodiment, each application server 10 recognizes the total amount of data based on the information indicating the unprocessed BO quantity that is added to the business object, and dynamically adjusts its own processing power in accordance with the recognized amount of data. The operations of the transmission agent 121 and the reception agent 122 of the adapter 12 for the dynamic adjustment of the processing power will now be described.

When the transmission agent 121 acquires data to be transmitted from the application executing section 11 and generates a business object, the transmission agent 121 calculates an unprocessed BO quantity based on the total amount of data to be transmitted in the present process, and stores, in the transmission data storage section 13, the generated business object together with the unprocessed BO quantity. When the unprocessed BO quantity is large, the transmission agent 121 increases the level of its own processing power to cope with this.

Figure 4:
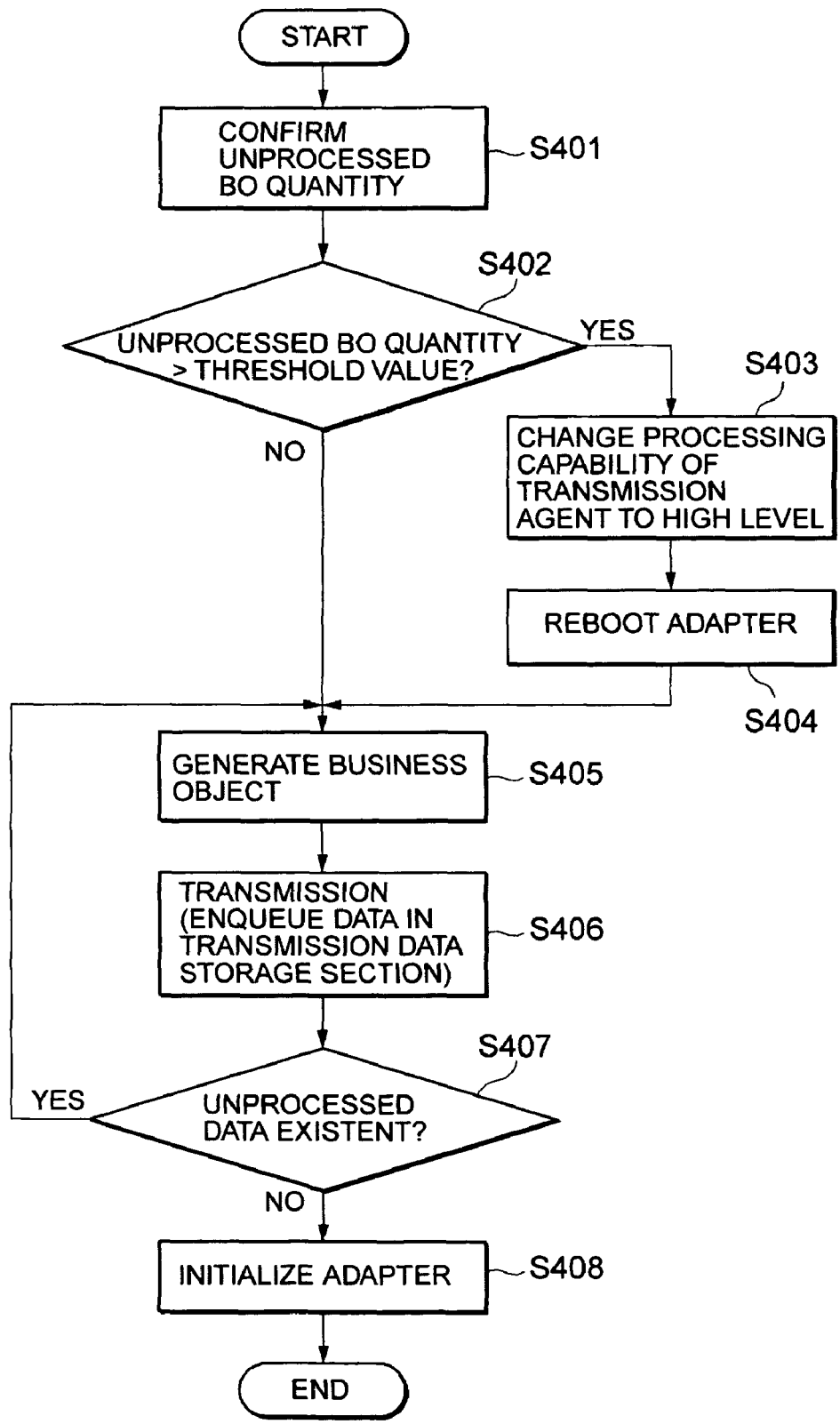
FIG. 4 is a flowchart for explaining the operation of a transmission agent according to the embodiment.

FIG. 4 is a flowchart for explaining the operation of the transmission agent 121.

Referring to FIG. 4, for acquisition of data from the application executing section 11, the transmission agent 121 employs, for example, "select count (*)" of the SQL (Structured Query Language) to confirm the unprocessed data quantity in the process performed by the application executing section 11 (step 401). Naturally, the unprocessed data quantity initially corresponds to the total amount of data to be transmitted. Then, when the unprocessed data quantity is equal to or smaller than a predesignated threshold value, the transmission agent 121 employs the data to be transmitted to simply generate a business object to which the unprocessed BO quantity is added (steps 402 and 405), and enqueues the business object in the transmission storage section 13 (step 406). For all the unprocessed data, the transmission agent 121 repeats the generation of a business object and the enqueueing of the business object in the transmission storage section 13 (step 407). When unprocessed data are not any longer existent, the transmission agent 121 initializes the adapter 12, terminates the processing (step 408), and waits for the next transmission data.

When the unprocessed data quantity is greater than the predesignated threshold value, the transmission agent 121 changes its own processing power to a high level (steps 402 and 403), and reboots the adapter 12 (step 404). Thus, in the processes following the step 405, the transmission agent 121 can be operated with a higher processing power than in its normal state. A method for increasing the processing power may be a method for increasing the amount of data to be handled at one time (processing unit), a method for shortening a polling interval when the transmission agent 121 is of a polling type, or the like. Since the adapter 12 is initialized after all the data to be transmitted have been enqueued in the transmission data storage section 13 (step 408), the processing power of the transmission agent 121 is returned to the normal level. The processing power of the transmission agent 121 is reduced (returned to the normal level) when a small amount of data is to be transmitted. It is therefore possible to prevent resources from being allocated more than necessary for data communication.

The operation of the reception agent 122 will now be described. When the reception agent 122 provides a received business object to the application executing section 11, the reception agent 122 refers to the unprocessed BO quantity that is added to this business object. When the unprocessed BO quantity is large, that is, when a large amount of data are received, the reception agent 122 increases its own processing power to cope with this.

Figure 5:
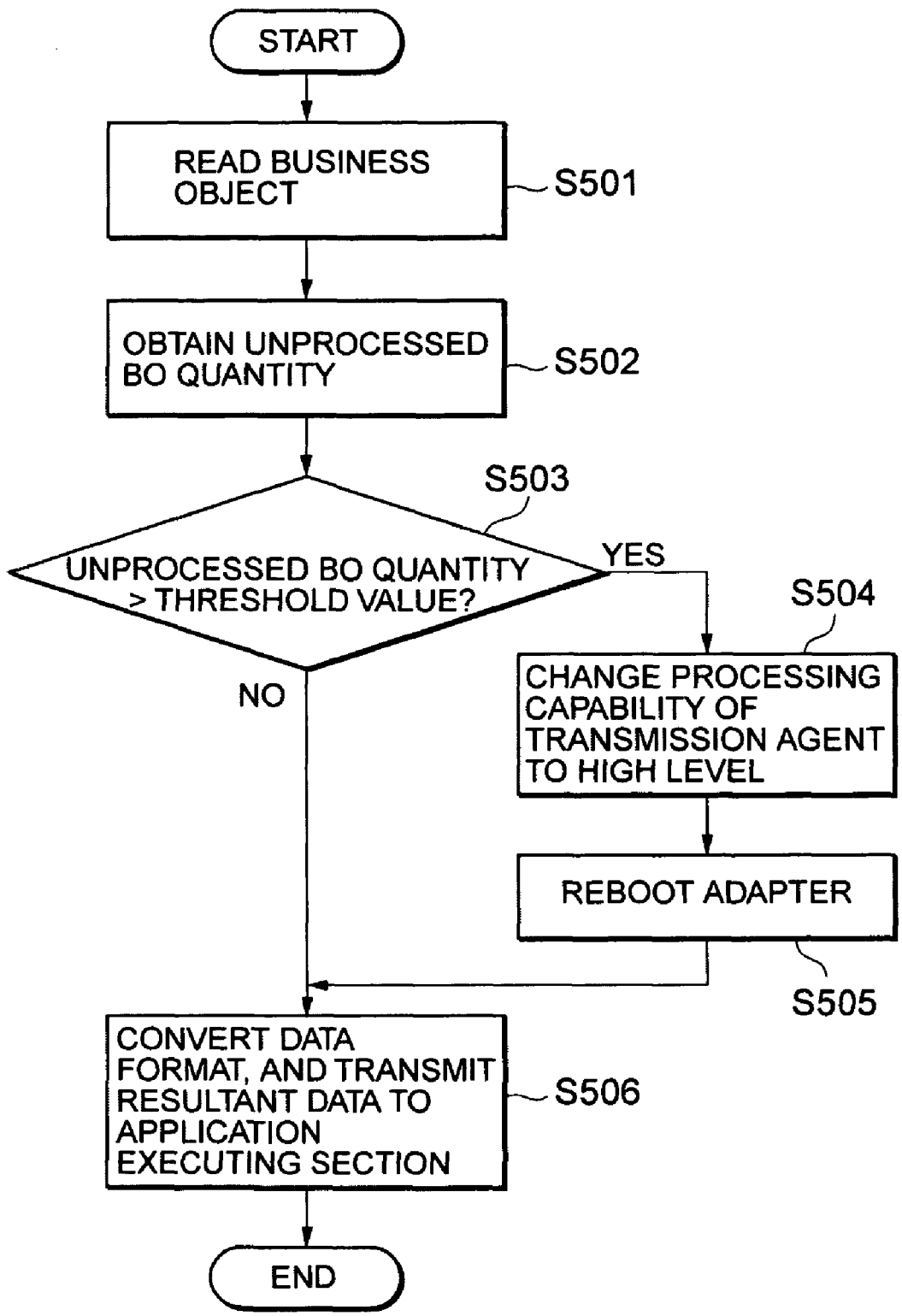
FIG. 5 is a flowchart for explaining the operation of a reception agent according to the embodiment.

FIG. 5 is a flowchart for explaining the operation of the reception agent 122.

Referring to FIG. 5, when the data (business objects) received from the integration server 20 are stored in the reception data storage section 14, the reception agent 122 extracts and reads the first business object (step 501), and examines the unprocessed BO quantity information included in this business object (step 502). When the unprocessed BO quantity is equal to or smaller than a predesignated threshold value, the reception agent 122 simply converts the business object into a data format used by the application executing section 11, and provides the business object to the application executing section 11 (steps 503 and 506).

When the unprocessed BO quantity described in the business object is greater than the predesignated threshold value, the reception agent 122 changes its processing power to a high level (steps 503 and 504), and reboots the adapter 12 (step 505). Thus, in step 506 where data are provided to the application executing section 11, the reception agent 122 can be operated with the processing power higher than in its normal state. Similarly to the case of the transmission agent 121, a method for increasing the processing power may be a method for increasing the amount of data to be handled at one time (processing unit), a method for shortening a polling interval when the reception agent 122 is of a pooling type, or the like.

It should be noted that the operation shown in FIG. 5 is performed at a predetermined time when the reception agent 122 has the normal processing power. Once the reception agent 122 gets into the state where the processing power is at a higher level than the normal state, extraction and conversion of a business object and the transmission of the business object to the application executing section 11 are performed with the high processing power. The determination in step 503 and the processes in steps 504 and 505 are not performed.

Further, similarly to the case of the transmission agent 121, it is preferable that, from the viewpoint of resource management, the processing power of the reception agent 122 be reduced (returned to the normal state) when the unprocessed BO quantity is small (that is, in a case where a small amount of data is received). In FIG. 5, however, the operation for returning the processing power from the high level to the normal level is not shown. Further, the fact that the unprocessed BO quantity obtained from the business object is equal to or smaller than the threshold value is not sufficient as the condition under which the processing power of the reception agent 122 is returned from the high level to the normal level.

FIG. 6 is a diagram showing a state where the application server 10 on the reception side receives data from a plurality of application servers 10 at the same time. In FIG. 6, an application server 10a on the transmission side transmits a small amount of data (in a low load state), while an application server 10b on the transmission side transmits a large amount of data (in a high load state). That is, the unprocessed BO quantity of the business objects transmitted from the application server 10a is small (equal to or smaller than a threshold value), while the unprocessed BO quantity of the business objects transmitted from the application server 10b is large (beyond the threshold value). Since data are transmitted as business objects, as is shown in FIG. 6, a business object transmitted by the application server 10a may be inserted between the business objects transmitted by the application server 10b and delivered to the application server 10c. In this case, if the processing power is changed for each business object extracted from the reception data storage section 14, the operating cost would be increased and the work efficiency would be reduced.

Therefore, in this embodiment, the switching of the processing power of the reception agent is rendered sluggish. For example, when several business objects, whose unprocessed BO quantity is equal to or smaller than the threshold value, are sequentially received in succession, the processing power of the reception agent 122 is changed from the high level to the normal level. With this arrangement, when, as is shown in FIG. 6, business objects indicating a large unprocessed BO quantity and a business object indicating a small unprocessed BO quantity are alternately received, it is possible to prevent the frequent switching of the processing power and the reduction of the operating efficiency.

FIG. 7 is a flowchart for explaining the operation of the reception agent 122 based on the above idea for returning its processing power from the high state to the normal state.

Referring to FIG. 7, the reception agent 122 examines the unprocessed BO quantity of the business object that is extracted from the reception data storage section 14 (steps 701 and 702). When the unprocessed BO quantity is equal to or smaller than a threshold value, determines whether or not such business objects are received a predetermined number of times in succession (step 703). When the business objects for which the unprocessed BO quantity is equal to or smaller than the threshold value are received the predetermined number of times in succession, the reception agent 122 initializes the adapter 122 (step 704). As a result, the operating state of the reception agent 122 is returned to the normal state.

In this operation, the processes in steps 702 and 703 are preformed in parallel to the conversion of the business object that is extracted from the reception data storage section 14 and the transmission of this business object to the application executing section 11. The process in step 704 is performed before the conversion of the business object for which the decision made in step 703 is Yes.

In the above operations, the processing power of the transmission agent 121 and the reception agent 122 should be changed to the highest level as available for the adapter 12. This is because a large operating cost is required for changing the processing power, such as rebooting the adapter 12. It is not preferable that the processing power be changed frequently to many levels, because the efficiency would be deteriorated.

In accordance with the power of the individual application servers 10, the threshold values for the unprocessed BO quantities are independently designated as conditions for changing the processing power of the transmission agent 121 and the reception agent 122. That is, there is a case where, in the application server 10 on a transmission side, the processing power of the transmission agent 121 is increased because the unprocessed data quantity is beyond the threshold value, and in the application server 10 on a reception side that has received the business object for the data, the reception agent 122 is operated with the normal processing power because the unprocessed BO quantity is not beyond the threshold value. On the contrary, there is a case where, in the application sever 10 on a transmission side, the transmission agent 121 is operated with the normal processing power because the unprocessed data quantity is below the threshold value, and in the application server 10 on the reception side that has received the business object for the data, the reception power of the reception agent 122 is increased because the unprocessed BO quantity is beyond the threshold value.

According to the above-described operation, when the unprocessed BO quantity of the received business object is beyond the threshold value, the processing power of the reception agent 122 is immediately changed to a high level, and when several business objects whose unprocessed BO quantity is equal to or smaller than the threshold value, are received in succession, the processing power is returned to the normal state. As another condition for changing the processing power of the reception agent 122, a given number of cycles may be designated for reception of business objects, and the processing power may be changed in accordance with the number of business objects received during the given number of cycles whose unprocessed BO quantity is beyond the threshold value (or equal to or smaller than the threshold value).

Specifically, the following control process may be performed. For example, the given number of cycles is five. When there is one business object whose unprocessed BO quantity is beyond the threshold value among business objects received during the given number of cycles, i.e., among five business objects received in succession, the processing power of the reception agent 122 is changed to a high level. When the unprocessed BO quantities of all the five business objects received in succession are equal to or smaller than the threshold value, the processing power of the reception agent 122 is returned to the normal state.

According to EAI to which this embodiment is applied, when a predetermined application server 10 on a reception side does not simultaneously receive business objects from a plurality of application servers 10, an application server 10 on a transmission side may add the unprocessed BO quantity only to the first business object. In this example, since it does not occur that business objects transmitted from a plurality of application servers 10 coexist in business objects received during a predetermined period of time, the processing power of the reception agent 122 can be changed based on the unprocessed BO quantity obtained from the first business object.

In this embodiment, each individual application server 10 and the integration server 20 perform asynchronous communication using MQ (Message Queuing). However, with no problem, the communication control method in this embodiment can also be employed for a system where each application server 10 and the integration server 20 perform synchronous communication using, for example, the IDL (Interface Definition language).

FIG. 8 is a diagram showing the functional configuration of each server for the system where the application servers 10 and the integration server 20 perform synchronous communication.

Referring to FIG. 8, each of the application servers 10 includes the application executing section 11 and the adapter 12 similar to the application servers 10 in FIG. 3. The application servers 10, however, do not include the transmission data storage section 13 and the reception data storage section 14.

The integration server 20 includes the transmitting/receiving section 21, the data converter 22 and the integrating processing section 23 similar to the integration server 20 in FIG. 3. It should be noted, however, that the transmitting/receiving section 21 does not include a queue realized by the main memory 103 in FIG. 2, and therefore immediately provides a business object received from the application server 10 to the data converter 22, and immediately transmits, to a destination application server 10, a business object to be transmitted that is received from the data converter 22.

With this arrangement, in the adapter 12 of each application server 10, the transmission agent 121 calculates the unprocessed BO quantity based on the amount of data to be transmitted that is obtained from the application executing section 11, and transmits a generated business object together with information on the amount of data to the integration server 20. When the unprocessed BO quantity is large, the transmission agent 121 can increase its own processing power to cope with the process. The reception agent 122 refers to the unprocessed BO quantity added to the business object received from the integration server 20, and when the unprocessed BO quantity is large, increases its own processing power to cope with the process.

As is described above, according to this embodiment, the application server 10 on a transmission side adds information on the amount of the data to be transmitted to the data themselves. Hence, when the first business object is received, the application server 10 on a reception side can obtain the total amount of data to be received. Based on this information, the processing power of the adapter 12 can be dynamically adjusted. Therefore, the change in the amount of data exchanged between predetermined application servers can be flexibly coped with, and the communication traffic in EAI can be automatically optimized.

Furthermore, to realize the system of this embodiment, only a field need be added to an XML file of a business object in addition the making the processing power of the transmission agent 121 and the reception agent 122 changeable in the adapter 12 of each application server 10. Therefore, the system can be provided only by software design, without adversely affecting hardware design, such as providing of a bypass line between the specified application servers 10. Consequently, the system can be easily introduced into not only a new EAI system, but also into a preexisting EAI system.

In this embodiment, the processing power of the reception agent 122 of the adapter 12 of the application server 10 can be changed. As another example, the processing power of the application executing section 11 on a reception side may also be changed. As still another example, the processing power of the reception agent 122 and the processing power of the application executing section 11 (on a reception side) both may also be changed. Further, instead of changing the processing power on a reception side, the processing power of the application server 10 on a reception side and that of the integration server 20 may also be changed. A specific method for changing the processing power of the application executing section 11 and the integrating processing section 23 may be a method for increasing or reducing the number of threads that is allocated for the application execution process or the integration process, a method for changing the scheduling priority for the application process and the integrating process, or the like.

The present invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

While the invention has been shown and described with reference to particular embodiments thereof, it will be understood by those skilled in the art that the foregoing and other changes in form and detail may be made therein without departing from the spirit and scope of the invention, including but not limited to additional, less or modified elements and/or additional, less or modified blocks performed in the same or a different order.

The invention claimed is:

1. A data processing system having a plurality of application servers having adjustable processing power each connected to an integration server by a network, the system comprising:
    a first adapter in a transmission application server, said first adapter transmitting a first data from said transmission application server to said integration server, said first data having live data and information regarding an expected number of data packets to be transmitted to said integration server;
    an integration processing section in said integration server for determining a destination application server for processing said transmitted data and for transmitting said first data to said destination application server;
    a third application server having a third adapter for transmitting a second data from said third application server to said integration server, said second data having said live data and said information regarding said expected number of data packets to be transmitted to said integration server; and
    a second adapter in said destination application server that receives said live data and said information regarding said expected number of data packets from both said transmission application server and said third application server, wherein said destination application server dynamically adjusts its processing power in response to the information regarding said expected number of data packets received from said transmission application server and the information regarding said expected number of data packets received from said third application server and, wherein said processing rower is a number of cycles within a predetermined period of time.

2. The system according to claim 1, wherein said first adapter:
    transmits said first data by converting said first data into a business object, wherein said business object includes at least one of a plurality of data packets;
    adds an unprocessed business object quantity to said business object; and
    transmits said business object and said unprocessed business object quantity representing information on a number of unprocessed succeeding business objects, wherein said unprocessed business object quantity indicates a number of unprocessed succeeding data packets.

3. The system according to claim 2, wherein said destination application server adjusts its processing power if the unprocessed business object quantity satisfies a predesignated threshold value.

4. The system according to claim 2, wherein said destination application server adjusts its processing power in response to successively receiving, during a designated number of repetition cycles, a specified number of said business objects having an unprocessed business object quantity satisfying a predesignated threshold value.

5. The system according to claim 1, wherein the second adapter is a reception agent and autonomically changes the processing power of the destination application server based on an unprocessed business object quantity.

6. The system according to claim 1, wherein the first adapter changes the processing power of the transmission application server in response to an unprocessed business object quantity.

7. The system according to claim 2, wherein the integration server changes its processing power in response to the unprocessed business object quantity added to said business object received from said transmission application server.

8. The system according to claim 1, wherein the second adapter transmits a third data from said destination application server to said integration server, said third data having said live data and said information regarding said expected number of data packets to be transmitted to said integration server;
    wherein said integration server transmits said third data to said transmission application server; and
    wherein said first adapter receives said third data and said information regarding said expected number of data packets received from said integration server, and wherein said transmission application server adjusts its processing power in response to the information regarding said expected number of data packets received from said integration server.

9. The system according to claim 1, wherein the plurality of application servers are connected by a hub-and-spoke network and wherein said integration server is employed as a hub and said application servers as spokes.

10. The system according to claim 1, wherein the transmission application server processes data having a first data format and said destination application server processes data having a second data format that differs from said first data format, and wherein said integration server further includes:
    a data converter for converting said transmitted data from said first data format to an intermediate data format and for converting data from said intermediate format to said second data format before transmitting said data to said destination application server.

11. A method for adaptively changing application server processor power, the method comprising:
    creating a data transmission packet for transmitting business object data from a first adapter in a first application server to a second application server;
    modifying said first data having live data and information include a measure of an expected number of data packets to be transmitted; and
    transmitting said data transmission packet to an integration server;
    an integration processing section in said integration server determining a destination application server for processing said transmitted data and routing said first data to the destination application server; and
    a second adapter in said destination application server, receiving said live data and said information regarding said expected number of data packets;
    a third application server transmitting a second data to said integration server, said second data having said live data and said information regarding said expected number of data packets to be transmitted to said integration server; and in response to receiving said live data and said information regarding said expected number of data packets from both said transmission application server and said third application server, said destination application server dynamically adjusting its processing power in response to the information regarding said expected number of data packets received from said transmission application server and the information regarding said expected number of data packets received from said third application server, wherein said processing power is a number of cycles within a predetermined period of time.

12. The method of claim 11, wherein the step of modifying comprises:
   testing said expected number of data packets against a first threshold value; and
   changing the processing power of said destination server to a high power level if said expected number of data packets exceeds the first threshold value.

13. The method of claim 11, wherein the step of modifying comprises:
   testing said expected number of data packets against a second threshold value; and
   changing the processing power of said destination server to a low power level if said expected number of data packets is at or below said second threshold value.

14. The method of claim 11, wherein the step of modifying comprises:
   testing said expected number of data packets against a first and a second threshold value; and
   changing the processing power of said destination application server to a high power level if said expected number of data packets exceeds said first threshold value in a first designated number of occurrences out of a specified number of transmitted packets; and
   changing the processing power of said destination application server to a low power level if said expected number of data packets exceeds said second threshold value in a second designated number of occurrences out of a specified number of transmitted packets.

15. The method of claim 11, wherein the step of routing said transmission packet further comprises:
   converting data in said transmission packet from a first format to an intermediate format;
   determining a destination routing for said transmission packet;
   converting data in said transmission packet from said intermediate format to a second data format and replacing said data in said data packet;
   transmitting said data packet to said destination application server.

16. A computer program product embodied in a computer readable storage medium, said computer program product causing one or more computing devices to perform the process of claim 15 when loaded on to said one or more computing devices.

17. A method for adaptively changing a destination application server processor power, the method comprising:
   receiving a data transmission packet having first business object data from a transmission application server, said first business object data having live data and information including a measure of an expected number of data packets to be transmitted by said transmission application server; and
   transmitting said data transmission packet to an integration server;
   said integration server determining a destination application server for processing said data transmission packet and routing said data transmission packet to the determined destination application server having an adjustable processing power; and
   said destination application server receiving said live data and said information regarding said expected number of data packets;
   a third application server transmitting a second data to said integration server, said second data having said live data and said information regarding said expected number of data packets to be transmitted to said integration server; and
   in response to receiving said live data and said information regarding said expected number of data packets from both said transmission application server and said third application server, said destination application server dynamically adjusting its processing rower in response to the information regarding said expected number of data packets received from said transmission application server and the information regarding said expected number of data packets received from said third application server, wherein said processing rower is a number of cycles within a predetermined period of time.

18. The method of claim 17, wherein the step of modifying comprises:
   testing said measure of expected number of data packets against a first and a second threshold value; and
   changing the processing power of said destination application server to a high power level if said expected number of data packets exceeds said first threshold value in a first designated number of occurrences out of a specified number of transmitted packets; and
   changing the processing power of said destination application server to a low power level if said expected number of data packets exceeds said second threshold value in a second designated number of occurrences out of a specified number of transmitted packets.

\* \* \* \* \*